US011041581B2

(12) United States Patent
Stearns et al.

(10) Patent No.: US 11,041,581 B2
(45) Date of Patent: Jun. 22, 2021

(54) ZERO DEAD VOLUME FITTING ASSEMBLY

(71) Applicant: Valco Instruments Company, L.P., Houston, TX (US)

(72) Inventors: Stanley D. Stearns, Houston, TX (US); H. Max Loy, Jr., Houston, TX (US)

(73) Assignee: Valco Instruments Company, L.P., Houston, TX (US)

( * ) Notice: Subject to any disclaimer, the term of this patent is extended or adjusted under 35 U.S.C. 154(b) by 437 days.

(21) Appl. No.: 16/048,681

(22) Filed: Jul. 30, 2018

(65) Prior Publication Data

US 2019/0264844 A1    Aug. 29, 2019

Related U.S. Application Data

(60) Provisional application No. 62/635,196, filed on Feb. 26, 2018.

(51) Int. Cl.
| | | |
|---|---|---|
| *F16L 19/07* | (2006.01) | |
| *F16L 19/02* | (2006.01) | |
| *F16L 19/065* | (2006.01) | |
| *G01N 30/60* | (2006.01) | |

(52) U.S. Cl.
CPC ....... *F16L 19/0218* (2013.01); *F16L 19/0231* (2013.01); *F16L 19/0653* (2013.01); *F16L 19/07* (2013.01); *G01N 30/60* (2013.01); *G01N 30/6026* (2013.01); *G01N 30/6039* (2013.01)

(58) Field of Classification Search
CPC ... F16L 19/0218; F16L 19/07; F16L 19/0653; F16L 19/0231; G01N 30/6039; G01N 30/6026; G01N 30/60
See application file for complete search history.

(56) References Cited

U.S. PATENT DOCUMENTS

| | | | | |
|---|---|---|---|---|
| 4,776,618 | A | * | 10/1988 | Barree .................. F16L 19/061 285/341 |
| 6,056,331 | A | | 5/2000 | Benett |
| 6,494,500 | B1 | * | 12/2002 | Todosiev ........... G01N 30/6026 285/279 |
| 7,316,777 | B2 | | 1/2008 | Loy, Jr. |
| 8,740,261 | B2 | * | 6/2014 | Ford ..................... F16L 19/065 285/385 |
| 9,539,524 | B2 | | 1/2017 | Stearns et al. |
| 9,546,646 | B2 | | 1/2017 | Stearns et al. |
| 9,822,772 | B2 | | 11/2017 | Stearns et al. |
| 10,174,871 | B2 | | 1/2019 | Stearns et al. |
| 2006/0169628 | A1 | | 8/2006 | Loy, Jr. |
| 2012/0319400 | A1 | * | 12/2012 | Ford .................. G01N 30/6039 285/354 |
| 2014/0130580 | A1 | | 5/2014 | McAdams et al. |

(Continued)

OTHER PUBLICATIONS

Harry C. Kim, International Preliminary Report on Patentability—PCT/US2019/019544, dated Feb. 18, 2020, 6 pages, United States Patent & Trademark as International Searching Authority, Alexandria, Virginia, USA.

(Continued)

*Primary Examiner* — Matthew Troutman
*Assistant Examiner* — James A Linford
(74) *Attorney, Agent, or Firm* — Crain, Caton & James, P.C.; James E. Hudson, III

(57) ABSTRACT

The disclosure pertains to an assembly for use in connecting tubing to a fitting with zero dead volume.

2 Claims, 2 Drawing Sheets

(56) References Cited

U.S. PATENT DOCUMENTS

2015/0198567 A1\* 7/2015 Buerger ................ G01N 30/14
 285/347
2016/0116088 A1 4/2016 Graham et al.
2017/0254452 A1 9/2017 Stearns et al.
2019/0137015 A1 5/2019 Stearns et al.

OTHER PUBLICATIONS

Harry C. Kim, Notification of Transmittal of International Preliminary Report on Patentability—PCT/US2019/019544, dated Feb. 18, 2020, 1 page, United States Patent & Trademark as International Searching Authority, Alexandria, Virginia, USA.
Blaine R. Copenheaver, International Search Report—PCT/US2019/019544 and Examiner's Search Strategy and Results, May 9, 2019, 9 pages, United States Patent & Trademark as International Searching Authority, Alexandria, Virginia, USA.
Blaine R. Copenheaver, Written Opinion of the International Search Authority—PCT/US2019/019544, dated May 9, 2019, 5 pages, United States Patent & Trademark as International Searching Authority, Alexandria, Virginia, USA.

\* cited by examiner

ZERO DEAD VOLUME FITTING ASSEMBLY

CROSS-REFERENCE TO RELATED APPLICATIONS

This application claims the benefit of U.S. Patent Application 62/635,196 filed Feb. 26, 2018 for "Zero dead volume fitting assembly" priority to which is hereby claimed.

STATEMENT REGARDING FEDERALLY SPONSORED RESEARCH OR DEVELOPMENT

Not Applicable.

FIELD

This disclosure pertains to fittings for use in systems designed for chemical analysis where zero dead volume is required.

BACKGROUND

It is necessary in analytical systems to have fittings that create leak-tight seals. In such analytical systems, it is also desirous to have fittings which are inert relative to the sample components, which provide a flow path without inducing turbulence or mixing, and which adds minimal dead volume to the system.

Fitting designs which best address the aspect of added dead volume allow the tube ends which pass through such fittings to butt directly to each other or have bores which match the tubing bore, leaving no dead or unswept volume. Such fittings are called zero dead volume fittings. In analytical testing apparati dead volume is to be avoided as it reduces efficiencies of the test equipment, including gas columns.

One of the most common types of such zero dead volume fittings is a compression fitting. A zero dead volume compression fitting consists of a fitting having a female fitting detail, tubing, a ferrule loosely riding on the tubing, and a male nut, also riding on the tubing. In operation the tubing is placed into the fitting until the tubing end passes through the inner bore of the fitting and seats correctly at the bottom of the fitting detail, the ferrule is then slid along the tubing until it engages the mating walls of the fitting, and the nut is threadedly engaged so as to be retained in place and to deform the ferrule against the mating wall of the fitting detail, causing the ferrule to apply pressure to the tubing and force such tubing against the bottom of the fitting detail.

Basic problems with such system are inherent in the type and number of parts, namely the fitting, the ferrule, the tubing and nut. The fitting and ferrule need be sufficiently sized so that the ferrule can be deformed against the fitting to provide a seal, which often provides some volume at the interface of these components. The ferrule in these systems necessarily must be deformable provide a seal, but the force necessary to do so may be exceeded and thus overdrive the tubing into the fitting and interfere with operation of the associated valve. This problem is acerbated in a multi-ported valve having a plurality of fitting bodies associated with it and the overtightening into one or more of the detail associated with a port. Moreover, these systems must sustain the associated high pressures, must not deform the associated fitting, and must not have any extraneous volume creating an undesirable mixing chamber.

SUMMARY

The present disclosure provides a high pressure capillary tubing connector system for use with a zero dead volume fitting which includes a main body, a primary seal, inert tubing, a ferrule, and a retaining member, where the zero dead volume fitting has a zero dead volume fitting detail having a zero dead volume fitting detail pilot which terminates at a zero dead volume fitting detail pilot bottom and which has a zero dead volume fitting detail pilot length and having a zero dead volume fitting detail ferrule seat. The main body, adapted to engage the zero dead volume fitting, has a main body tubing bore therethrough sized to a tubing and has a main body internal bore at a main body first end, which ire body internal bore has a main body internal bore diameter sized to receive a primary seal and a main body internal counter bore depth sufficient to retain the primary seal in the absence of the tubing. The primary seal has a primary seal bore therethrough, sized for clearance of the tubing, has a primary seal first driving face adapted to contact a main body first end face of the main body internal bore, has a primary seal first section sized to fit the main body internal bore and to extend beyond the main body internal bore, has a primary seal first outer diameter equivalent or greater than the main body internal bore diameter, and has a primary seal first section length greater than the main body internal counter bore depth. Additionally, the primary seal has a primary seal second section having a primary seal second outer diameter equivalent to or less than than the main body first end outer diameter, has a primary seal shoulder at the primary seal second section and is press fit into the main body internal bore. The ferrule, which encircles the tubing and has a ferrule first end and a ferrule second end face, has a ferrule wedge-shaped conical section sized to contact the zero dead volume fitting detail ferrule seat proximate the ferrule first end at a point of contact. The retaining member is adapted to engage the main body to removably apply force against the ferrule second end face and to maintain position relative to the zero dead volume fitting while maintaining the ferrule first end at the point of contact. The retaining member may be a nut having an external threaded surface for use with a zero dead volume fitting detail having an internally threaded surface.

BRIEF DESCRIPTION OF THE DRAWINGS

So that the manner in which the described features, advantages and objects of the disclosure, as well as others which will become apparent, are attained and can be understood in detail, more particular description of the disclosure briefly summarized above may be had by reference to the embodiments thereof that are illustrated in the drawings, which drawings form a part of this specification. It is to be noted, however, that the appended drawings illustrate only a typical preferred embodiment of the disclosure and are therefore not to be considered limiting of its scope as the disclosure may admit to other equally effective embodiments.

In the drawings.

DESCRIPTION OF THE PREFERRED EMBODIMENT

Figure 1:
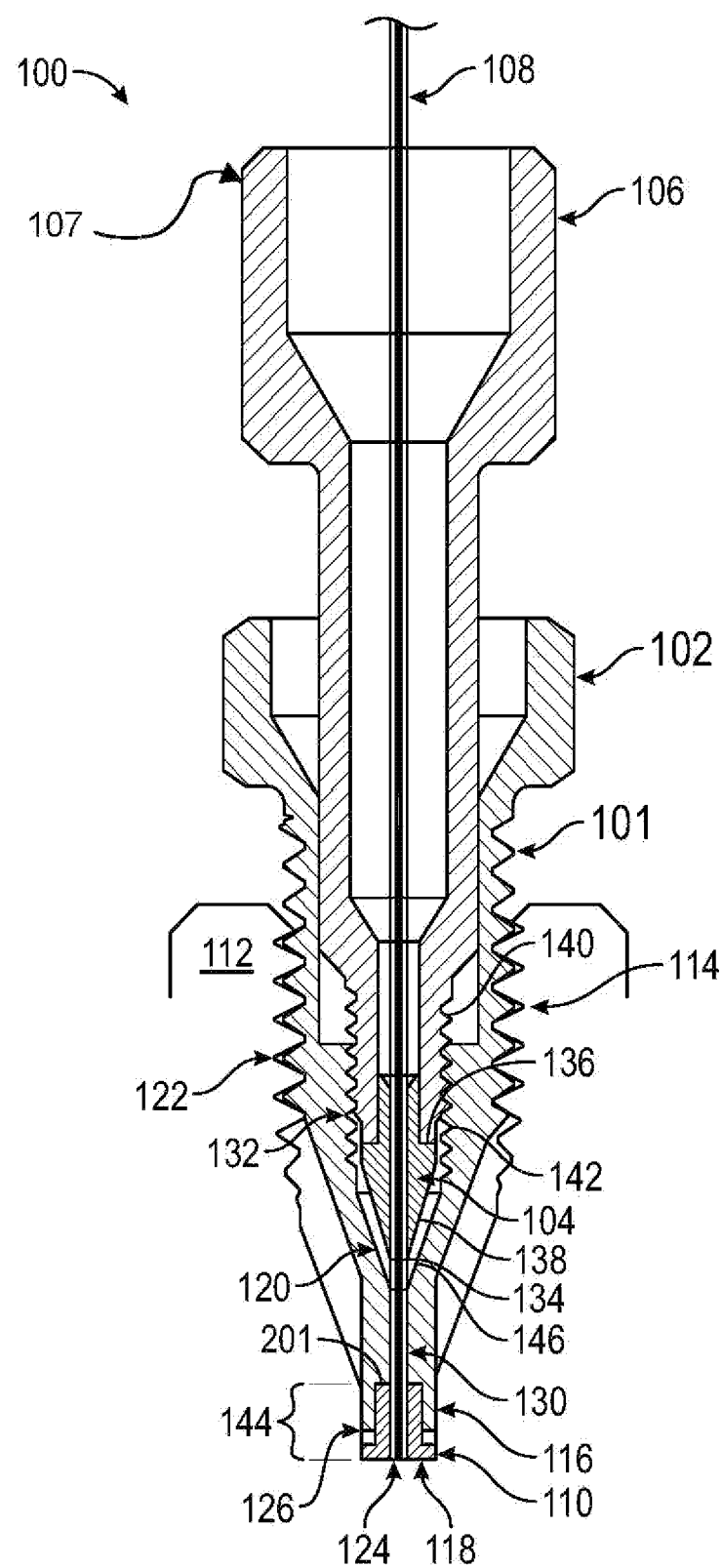
FIG. 1 is a cross sectional view of the assembly prior to tightening in a detail.

The zero dead volume fitting assembly, or system, 100 is provided in the present disclosure. The zero dead volume fining assembly 100 provides a zero dead volume reducing fitting. Referring to FIG. 1, a cross sectional view is provided of the zero dead volume fitting assembly 100, with a tubing 108 prior to tightening in a zero dead volume fitting or valve body 112. The zero dead volume fitting assembly 100 includes a main body 101, a ferrule 104, a retaining member 106, and a primary seal 110.

The retaining member 106 may have a retaining member head 107 with a hex profile, a knurled head, or any profile to aid in causing rotation. Similarly, the main body 101 may have a main body head 102, which may have a hex profile, a knurled head, or any profile to aid in causing rotation.

Tubing 108 may be fused silica or other material. When the zero dead volume fitting assembly 100 is positioned in a zero dead volume fitting or valve body 112, such as those known in the art, which have a zero dead volume fitting detail 114, and which includes a zero dead volume fitting detail pilot 116 sized to receive the fitting assembly 100 and the end of the main body 101. The zero dead volume fitting detail pilot 116 terminates at a zero dead volume fitting detail pilot bottom 118. The zero dead volume fitting or valve body 112 also has a zero dead volume fitting retention section 122, such as female threads, therein.

The primary seal 110 is adapted to convey a sample of liquid or gas, potentially at a high pressure, without contaminating the sample, by construction from an inert material. The primary seal 110 is also selected from an inert material which can be compressed to provide a seal against a mating flat surface 118 in a zero dead volume fitting detail. The mating flat surface 118 may be composed of steel. The primary seal 110 may be of a flexible inert materials PEEK (Poly Ether Ether Ketone), PTFE (PolyTetraFluoroEthylene), EWE (ethylene-tetrafluoroethylene), FEP (Flouridated Ethylene-Propylene), PFA (Perfluoroalkoxyethylene), and nylon or other materials.

When the zero dead volume fitting assembly 100 is assembled, the main body 101 is positioned within the zero dead volume fitting or valve body 112 and engages the fitting detail 114, preferably by a helical joinder such as a threaded fitting, though other fitting types may be used to provide sufficient compression of the primary seal 110 to ensure the primary seal 110 seats flat against the zero dead volume fitting detail pilot bottom 118. The tubing 108 is then provided within the retaining member 106 through ferrule 104 and through the main body 101 through the main body tubing bore 130 until its tubing first end 124 is fitted against the zero dead volume fitting detail pilot bottom 118. Notably, primary seal 110, after tightening, prevents the ferrule 104 from driving the tubing 108 hard into the zero dead volume fitting detail pilot bottom 118 of the detail 114. The ferrule 104 is slidably affixed to, and encircles, the tubing 108 and fits in the main body 101, seating against the zero dead volume fitting detail ferrule seat 120. The retaining member 106 is then engaged to the main body 101 at the zero dead volume fitting retention section 132. The engagement of the retaining member 106 to the main body 101 drives the ferrule 104 into the zero dead volume fitting detail ferrule seat 120 and causes the nose of the ferrule 104 to grip about the outer surface of the tubing 108. By fixing the ferrule 104 to the tubing 108 at this point, the extent of compression of the tubing 108 is fixed and the force applied to the zero dead volume fitting or valve body 112 is limited. The main body 101 includes main body first end face 126 at the end of the main body 101. Beneficially, the construction of the primary seal 110 prevents the ferrule 104 from overdriving the tubing 108 and potentially fracturing the tubing 108 if comprises of fused silica.

Figure 2:
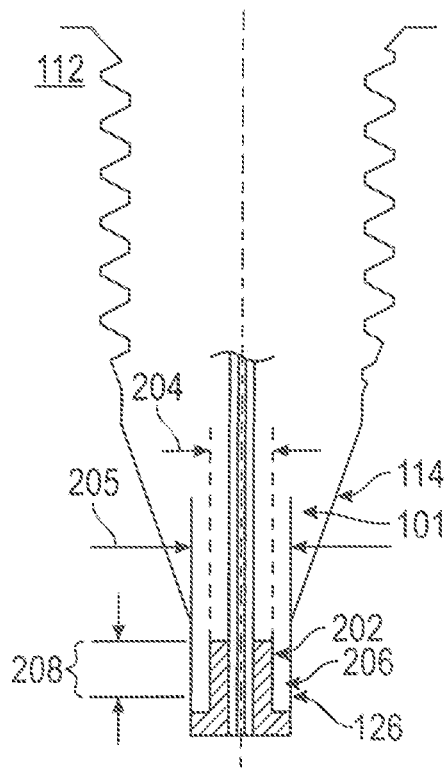
FIG. 2 is a cross sectional view of the end of the zero dead volume fitting or valve body.

Referring to FIG. 1 and to FIG. 2, a cross sectional view of the end of the zero dead volume fitting or valve body 112 and the main body 101, the first end of the main body 101 includes a main body internal counter bore 202 providing a main body internal counter bore diameter 204 sized to receive the primary seal 110. The difference in the main body internal counter bore 202 from the main body first end outer diameter 205 provides a main body wall 206 sized to the primary seal 110 and having a main body internal counter bore depth 208 sufficient to retain the primary seal in the absence of the tubing 108 and to encourage a seal about the tubing 108 when the main body 101 fully engages the zero dead volume fitting or valve body 112 and thereby causes compression of the primary seal 110 against the zero dead volume fitting detail pilot bottom 118.

Figure 3:
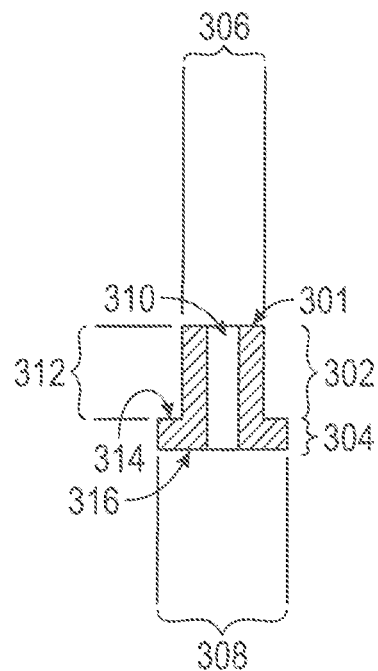
FIG. 3 is a cross sectional view of the primary seal of the present disclosure.

Referring to FIG. 3, a cross sectional view is provided of the primary seal 110. The primary seal 110 includes primary seal first driving face 301 which provides a surface to meet a main body counter bore face 201 of the main body internal counter bore 202, which may provide a flat surface or may provide a conic surface. The primary seal 110 includes a primary seal first section 302 sized to fit within, but extend beyond, the main body internal counter bore 202 in FIG. 2. The primary seal 110 therefore includes primary seal first outer diameter 306 which is sufficiently close to the main body internal counter bore diameter 204 in FIG. 2 to permit a press fit of the primary seal 110 into the main body 101. The primary seal first section 302 has a primary seal first section length 312 greater than the main body internal counter bore depth 208 in FIG. 2. The primary seal 110 includes a primary seal second section 304 sized to provide accurate alignment to primary seal second outer diameter 308, which is preferably equal to, or slightly larger or smaller, than the main body first end outer diameter 205 in FIG. 2. Due to the difference of the primary seal second outer diameter 308 and the primary seal first outer diameter 306, a primary seal shoulder 314 is found on the primary seal 110. When the primary seal 110 is positioned in the main body 101 such at the primary seal first driving face 301 abuts a surface to meet the main body first counter bore face 201 of the main body internal counter bore 202, the primary seal shoulder 314 remains free of contact with the main body first end face 126. The primary seal 110 includes a primary seal bore 310 therethrough, sized for clearance of the tubing 108. When the main body 101 fully engages the zero dead volume fitting or valve body 112 and thereby causes compression of the primary seal 110 against the zero dead volume fitting detail pilot bottom 118, the primary seal 110 thus collapsed about the tubing 108, without the primary seal second section 304 contacting the main body 101, the primary seal second face 316 fully seals against the zero dead volume fitting detail pilot bottom 118 of the zero dead volume fitting or valve body 112.

Thus, referring to FIGS. 1-3, a high pressure capillary tubing connector system 100 is provided for use with a zero dead volume fitting or valve body 112 and inert tubing 108 which includes a main body 101, a primary seal 110, a ferrule 104, and a retaining member 106, where the zero dead volume fitting or valve body 112 has a zero dead volume fitting detail 114 having a zero dead volume fitting detail pilot 116 which terminates at a zero dead volume fitting detail pilot bottom 118 and which has a zero dead volume fitting detail pilot length 144 and having a zero dead volume fitting flat bottom 118. The main body 101, adapted to engage the zero dead volume fitting or valve body 112, has a main body tubing bore 130 therethrough sized to the tubing 108 and has a main body internal counter bore at a main body first end, which main body internal counter bore 202 has a main body internal counter bore diameter 204 sized to receive a primary seal 110 and a main body internal counter bore depth 208 sufficient to retain the primary seal in the absence of the tubing 108. The primary seal 110 has a primary seal bore 310 therethrough, sized for clearance of the tubing 108, has a primary seal first driving face 301 adapted to contact a main body counter bore face 201 and a primary seal first section 302 sized to fit the main body internal counter bore 202 and to extend beyond the main body internal bore 130, has a primary seal first outer diameter 306 equivalent or greater than the main body internal counter bore diameter 204, and has a primary seal first section length 312 greater than the main body internal counter bore depth 208. Additionally, the primary seal 110 has a primary seal second section 304 having a primary seal second outer diameter 308 equivalent to or less than the main body first end outer diameter 205, has a primary seal shoulder 314 at the primary seal second section 304 and is press fit into the main body internal counter bore 202. The ferrule 104, which encircles the tubing 108 and has a ferrule first end 134 and a ferrule second end face 136, has a ferrule wedge-shaped conical section 138 sized to contact the zero dead volume fitting detail ferrule seat 120 proximate the ferrule first end 134 at a point of contact 146. The retaining member 106 is adapted to engage the main body 101 to removably apply force against the ferrule second end face 136 and to maintain position relative to the zero dead volume fitting or valve body 112 while maintaining the ferrule first end 134 at the point of contact 146. The retaining member 106 may be a nut having an external threaded surface 140 for use with a zero dead volume fitting detail 114 having an internally threaded surface 142.

It will be understood that while a preferred embodiment of the disclosure has been shown and described, the disclosure is not limited thereto. Many modifications may be made and will become apparent to those skilled in the art.

We claim:

1. A high pressure capillary tubing connector system for use with a zero dead volume fitting or a valve body, having a zero dead volume fitting detail, the zero dead volume fitting detail having a zero dead volume fitting detail pilot, the zero dead volume fitting detail pilot terminating at a zero dead volume fitting detail pilot bottom, the zero dead volume fitting detail pilot having a zero dead volume fitting detail pilot length, the zero dead volume fitting detail having a zero dead volume fitting detail ferrule seat, the high pressure capillary tubing connector system comprising: a main body, the main body having a main body tubing bore therethrough sized to an inert tubing, the main body having a main body internal counter bore at a main body first end, the main body first end having a main body first end face, the main body internal counter bore being cylindrical, the main body internal counter bore having a main body internal counter bore diameter sized to receive a primary seal, the main body internal counter bore having a main body internal counter bore depth sufficient to retain the primary seal in the absence of the tubing, the main body internal counter bore terminating at a main body counter bore face, the main body adapted to engage the zero dead volume fitting, the primary seal, the primary seal having a primary seal bore therethrough, sized for clearance of the tubing, the primary seal having a primary seal first driving face adapted to contact the main body counter bore face, the primary seal having a primary seal first section sized to fit the main body internal counter bore and to extend beyond the main body internal counter bore, the primary seal having a primary seal first outer diameter equivalent or greater than the main body internal counter bore diameter, the primary seal first section has a primary seal first section length greater than the main body internal counter bore depth, the primary seal having a primary seal second section having a primary seal second outer diameter equivalent to or less than the main body first end outer diameter, the primary seal second section being cylindrical, the primary seal second section sized to seat flat against the zero dead volume fitting detail pilot bottom at a primary seal second face, the primary seal second face being flat, the primary seal having a primary seal shoulder at the primary seal second section, the primary seal shoulder adapted for contact with the main body first end face, the primary seal press fit into the main body internal counter bore, a ferrule, the ferrule adapted to encircle the tubing, the ferrule having a ferrule first end, the ferrule having a ferrule wedge-shaped conical section sized to contact the zero dead volume fitting detail ferrule seat proximate the ferrule first end at a point of contact, the ferrule having a ferrule second end face, a retaining member, the retaining member adapted to engage the main body to removably apply force against the ferrule second end face, the retaining member adapted to maintain position relative to the zero dead volume fitting while maintaining the ferrule first end at the point of contact.

2. The high pressure tubing system of claim 1, wherein the retaining member is a nut having an external threaded surface and wherein the main body includes a nut having an internally threaded surface and an externally threaded surface and wherein the zero dead volume fitting includes an internally threaded surface.

* * * * *